US008981685B2

(12) United States Patent
Nee et al.

(10) Patent No.: US 8,981,685 B2
(45) Date of Patent: Mar. 17, 2015

(54) CONTROLLING RETARDING TORQUE IN AN ELECTRIC DRIVE SYSTEM

(71) Applicants: Brett M. Nee, Metamora, IL (US); Joshua M. Williams, Peoria, IL (US); Benjamin P. Gottemoller, Princeville, IL (US); Srikar Thaduvayi, Peoria, IL (US)

(72) Inventors: Brett M. Nee, Metamora, IL (US); Joshua M. Williams, Peoria, IL (US); Benjamin P. Gottemoller, Princeville, IL (US); Srikar Thaduvayi, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 164 days.

(21) Appl. No.: 13/723,288

(22) Filed: Dec. 21, 2012

(65) Prior Publication Data
US 2013/0162182 A1    Jun. 27, 2013

Related U.S. Application Data

(60) Provisional application No. 61/579,802, filed on Dec. 23, 2011.

(51) Int. Cl.
H02P 15/00    (2006.01)
B60L 7/02    (2006.01)
B60K 7/00    (2006.01)

(52) U.S. Cl.
CPC . H02P 15/00 (2013.01); B60L 7/02 (2013.01); B60K 7/0007 (2013.01); B60K 2007/0092 (2013.01); B60Y 2200/142 (2013.01)
USPC ............ 318/380; 318/375; 318/273; 318/362

(58) Field of Classification Search
CPC ....................................................... H02P 15/00
USPC ................................. 318/380, 375, 273, 362
See application file for complete search history.

(56) References Cited

U.S. PATENT DOCUMENTS

| 3,878,447 | A | | 4/1975 | MacDonald |
| 5,041,772 | A | * | 8/1991 | Earleson et al. .............. 318/375 |
| 5,530,328 | A | | 6/1996 | Fernandez et al. |
| 6,349,248 | B1 | | 2/2002 | Dean et al. |
| 6,725,134 | B2 | * | 4/2004 | Dillen et al. ..................... 701/19 |
| 6,949,902 | B2 | * | 9/2005 | Nakayama et al. ........... 318/432 |
| 7,378,808 | B2 | | 5/2008 | Kuras et al. |
| 7,426,427 | B2 | * | 9/2008 | Palandre et al. ................ 701/22 |
| 7,448,328 | B2 | | 11/2008 | Kumar |
| 2010/0039054 | A1 | | 2/2010 | Young et al. |
| 2011/0015807 | A1 | | 1/2011 | Young et al. |

* cited by examiner

Primary Examiner — David S Luo
(74) Attorney, Agent, or Firm — Leonard Stewart

(57) ABSTRACT

The disclosure describes, in one aspect, a system for a machine having an electric drive configuration. The system includes an electric motor associated with at least one wheel and adapted to provide retarding torque to the wheel, and a controller configured to determine a power measurement of a retarding grid and control the retarding torque to the at least one wheel during retarding as a function of the power measurement.

14 Claims, 2 Drawing Sheets

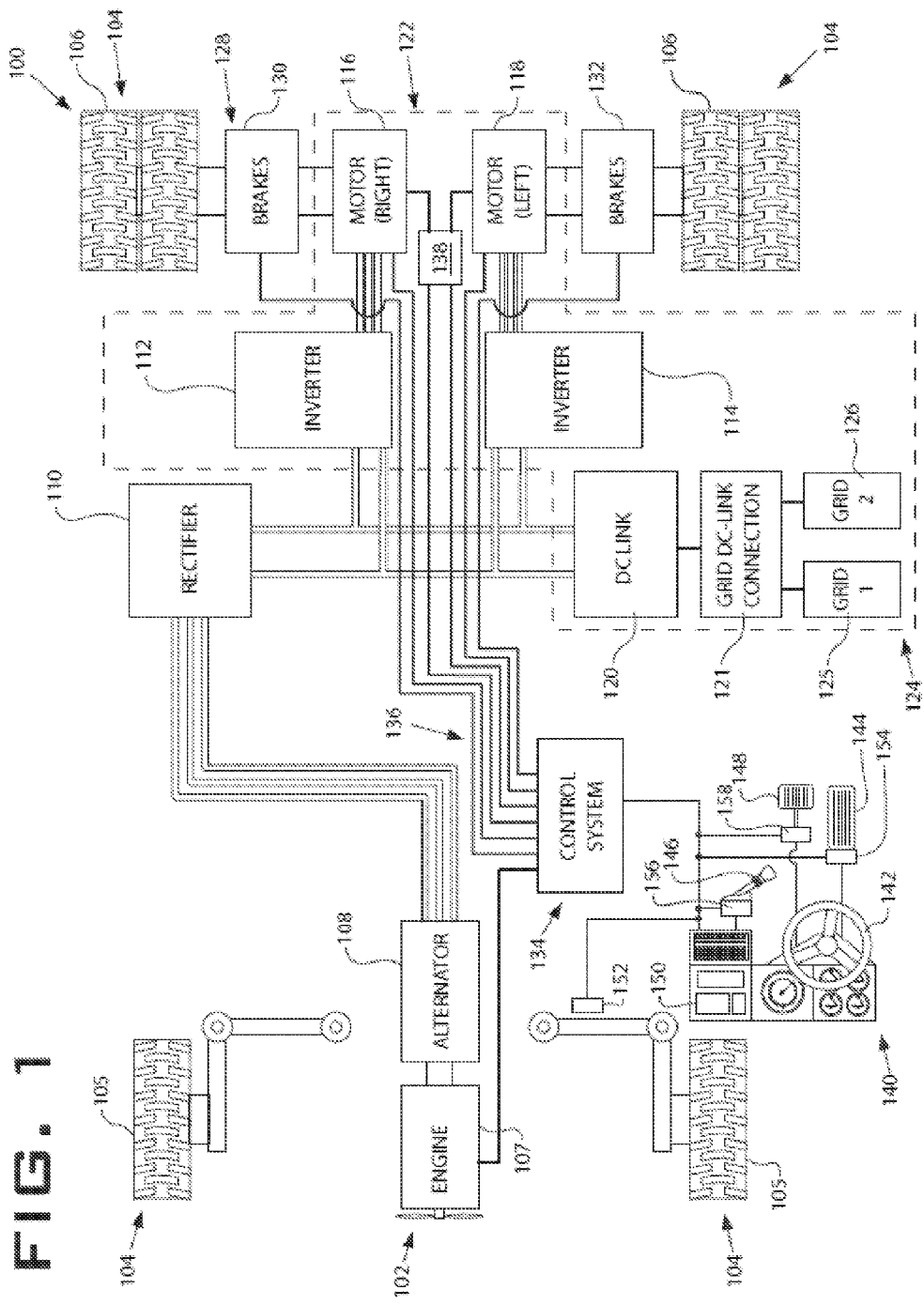

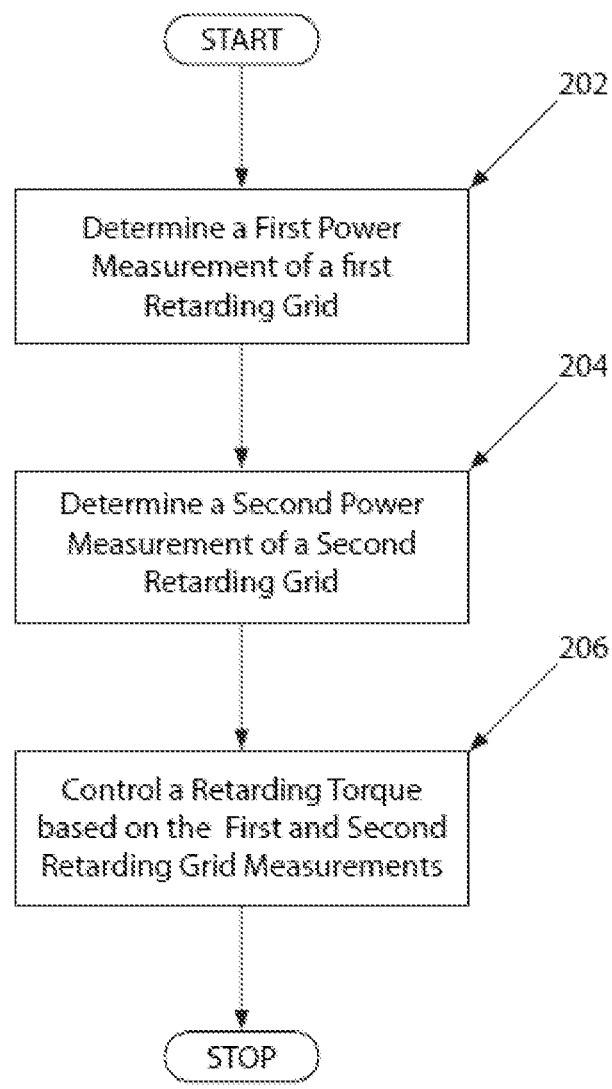

CONTROLLING RETARDING TORQUE IN AN ELECTRIC DRIVE SYSTEM

TECHNICAL FIELD

This patent disclosure generally relates to an electric drive system and, more particular, to systems and methods for controlling retarding torque for electric drive machines.

BACKGROUND

A typical electrical retarding system includes a retarding grid, which includes a series of resistors and insulators, through which thermal energy is dissipated when electrical current passes through the resistors. Due to the size of the machine and the magnitude of the momentum retarded, large amounts of thermal energy may be dissipated through the resistors and insulators as heat, which significantly elevate the temperatures of the resistors and insulators.

U.S. Pat. No. 7,378,808 ("the '808 patent") issued to Kuras et al. discloses an electric drive system. The electric drive system has a power source and a generator operatively connected to the power source. The generator is configured to produce a power output. The electric drive system also has at least one capacitor configured to store a supply of power. The electric drive system further has a common bus configured to direct the power output to the capacitor.

The electric drive system also has at least one motor configured to receive power from the common bus. The electric drive system additionally has a controller in communication with the at least one motor and the generator. The controller is configured to receive at least one input associated with the motor, to determine a requested motor power as a function of the at least one input, and to operate the generator to produce the requested motor power.

The disclosed systems and methods are directed to overcoming one or more of the problems set forth above.

SUMMARY

The disclosure describes, in one aspect, a system for a machine having an electric drive configuration. The system includes an electric motor associated with at least one wheel and adapted to provide retarding torque to the wheel, and a controller configured to determine a power measurement of a retarding grid and control the retarding torque to the at least one wheel during retarding as a function of the power measurement.

BRIEF DESCRIPTION OF THE DRAWINGS

FIG. 1 schematically illustrates an electric drive machine having a control system in accordance with an exemplary embodiment of the present disclosure.

FIG. 2 is a flow chart illustrating one embodiment of a method of controlling retarding torque in accordance with an exemplary embodiment of the present disclosure.

DETAILED DESCRIPTION

This disclosure relates to systems and methods for controlling retarding torque in an electric drive system as a function of a retarding grid power. An exemplary embodiment of a machine 100 is shown schematically in FIG. 1. The machine 100 may be an off-highway truck, as shown, or any other vehicle that has an electric drive system, including passenger vehicles, trains, earthmoving machines, and mining vehicles.

In an illustrated embodiment, the machine 100 includes an electric drive system 102 operatively coupled to travel mechanisms 104 to propel movement of the machine 100.

The travel mechanism 104 may include wheels and axles on each side of the machine 100. In the illustrated embodiment, the travel mechanisms 104 include a set of front wheels 105 on each side of the machine 100 and a set of rear dual wheels 106 on each side of the machine 100. The travel mechanisms 104 allow the machine 100 to travel on the surface of a type of terrain, such as earth surface terrain. The travel mechanisms 104 are shown as wheels, but it is contemplated that the travel mechanisms 104 may be any type of tractive or fraction mechanism known, such as, for example, tracks and belts.

The electric drive system 102 includes an engine 107, alternator 108, rectifier 110, inverters 112, 114, and motors 116, 118. The engine 107 may provide power for the machine 100 and other machine components. Suitable engines may include gasoline powered and diesel powered engines. In some embodiments, the engine 107 may be a diesel engine that generates and transfers power to other components of the machine 100 through a power transfer mechanism, for example, a shaft (not shown). In the illustrated embodiment, the engine 107 provides power to the alternator 108. The alternator 108 generates a three-phase alternating current, which produces electrical power.

In some embodiments, the rectifier of the electric drive system 102 may convert the three-phase alternating current to a direct current. One or more of the inverters 112, 114 convert the direct current to alternating current to power one or more of the electric motors 116, 118. The electric motors 116, 118 represent motors that transfer the electric power received from the alternator 108 into power that drives one or more of the travel mechanisms 104. For example, in some embodiments, the motors 116, 118 may be wheel motors used to drive a wheel or wheels to propel the machine 100. In some embodiments, the rear dual wheels 106 may be independently or directly driven such that each of the motors 116, 118 may correspondingly drive each of the driven rear dual wheels 106. A speed of the motors 116, 118 may be controlled by controlling the frequency of the alternating current produced by the inverters 112, 114.

In some embodiments, a single motor drives all of the travel mechanisms 104, while in some embodiments, a plurality of motors drives the travel mechanisms 104. In the illustrated embodiment, for example, an electric motor 116, 118 is associated with each travel mechanism 104 embodied as the rear dual wheels 106, including a right motor 116 and a left motor 118. In some embodiments, the engine 107 may be used to power some of the plurality of motors, while a separate electric power source or power storage unit such as a battery (not shown) may be used to power the remaining of the plurality of motors. In some embodiments, the motors 116, 118 may be driven directly from the separate electric power source.

The engine 107, alternator 108, rectifier 110, inverters 112, 114, and motors 116, 118 may be operatively coupled to provide power sufficient to propel the machine 100 in a forward or a reverse driving direction during a driving phase or propel phase of operation. When operating the machine 100 in the driving phase, the motors 116, 118 provide a propel torque sufficient to propel the machine 100 in the forward or the reverse driving directions. In some embodiments, the electric drive system 102 may include a final drive (not shown), which includes a planetary gear set connected between the motors 116, 118 and the travel mechanisms 104, to convert the speed of the motors 116, 118 into an appropriate magnitude of the propel torque to propel the machine 100 in the forward or reverse driving directions.

Further, the electric drive system 102 may dissipate power sufficiently to retard or provide braking to the machine 100 during a retarding phase of operation. During the retarding phase of operation, the inverters 112, 114, motors 116, 118, and a braking chopper or DC link 120, collectively define an electric retarding system 122. When operating the machine 100 in the retarding phase, the motors 116, 118 may provide a braking torque sufficient to cause the machine 100 to slow down and/or come to a complete stop. In some embodiments, the motors 116, 118 during retarding may generate alternating current that is converted to direct current by the inverters 112, 114 and that flows through the brake chopper 120 through a DC link connection 121, which provides direct current to direct current conversion, and into a retarding grid assembly or resistor grid assembly 124.

The retarding grid assembly 124 may include at least a first retarding grid 125 of resistive elements, or resistors (not shown) and insulators (not shown). The resistors may be adapted to receive current from the inverters 112, 114. The insulators may be adapted to receive heat being radiated from the resistors. The electrical power corresponding to the current generated by the motors 116, 118 may at least partially pass through the first retarding grid 125 and be dissipated as heat.

In some embodiments, additional or excess electrical power may also be dissipated as heat by passing through an optional second retarding grid 126. The second retarding grid 126 may similarly include a second set of resistors and insulators that are adapted to receive electrical power through the chopper 120 and dissipate the power as heat. The chopper 120 may serve to selectively route a portion of the electrical power through the second retarding grid 126. In other embodiments, the retarding grid assembly 124 may include a plurality of retarding grids including resistive elements and not be limited to only a first 125 and second 126.

In the retarding mode of operation, a significant amount of energy may be dissipated through the first retarding grid 125, which may translate into a significant amount of current being passed through the resistors. Dissipation of such energy may result in a substantial amount of heat being emitted at the retarding grid assembly 124. In some embodiments, the power that is generated by the motors 116, 118 during retarding may be used to power a fan (not shown) or other appropriate cooling system to reduce a temperature resulting from the heat energy radiating from the retarding grid assembly 124.

In some embodiments, the machine 100 may also include a braking system 128 that includes the electric retarding system 122 and one or more service brakes 130, 132 for retarding or braking the movement of the machine 100. In some embodiments, the braking system 128 and the one or more service brakes 130, 132 may be associated with corresponding travel mechanisms 104. In some embodiments, the braking system 128 and the one or more service brakes 130, 132 may be associated with the front wheels 105 and/or the rear wheels 106. In the illustrated embodiment, the braking system 128 includes the electric retarding system 122 and the one or more service brakes 130, 132 embodied as a right service brake 130 and a left service brake 132. The service brakes 130, 132 may be hydraulic friction, hydro-mechanical, or mechanical brakes.

In some embodiments, all of the braking required to reduce a speed of the machine 100 may be provided by the electric retarding system 122. In some embodiments, all of the braking required to reduce the speed of the machine 100 may be provided by the service brakes 130, 132. In the illustrated embodiment, if the electric retarding system 122 is not capable of providing all of the braking required, a portion of the braking required to reduce the speed of the machine 100 is provided by the electric retarding system 122 and a portion of the braking required to reduce the speed of the machine 100 is provided by the service brakes 130, 132.

The service brakes 130, 132 may be manually actuated by an operator, which also allows the operator to manually control the speed of the machine 100. In some embodiments, the service brakes 130, 132 may be mechanically, electro-mechanically, hydraulically, pneumatically, or actuated by other known methods. In the illustrated embodiment, the service brakes 130, 132 may be automatically actuated by a control system 134. In some embodiments, the control system 134 may determine an appropriate ratio of retarding torque splits between, for example, the left and right set of dual wheels 106, or between the rear wheels 106 and the front wheels 105. In other words, the portion of braking provided by the electric retarding system 122 may be split between the left and right travel mechanisms 104 and/or between the rear dual wheels 106 and the front wheels 105.

In the illustrated embodiment, the control system 134 may be in communication with the electric drive system 102 through a data link interface 136. Additionally, or alternatively, the control system 134 may be in communication with the electric drive system 102 and other machine components wirelessly or remotely. In some embodiments, the control system 134 may send a command to the one or more components in response to signals collected and transmitted from one or more sensors 138. The control system 134 may receive sensor signals directly from the one or more sensors or indirectly such as, for example, from the data link interface 136.

In the illustrated embodiment, the control system 134, which may be configured to perform certain control functions, is operatively connected to the electric drive system 102 through the data link interface 136. The data link interface 136 may represent one or more interface devices that interconnect one or more data links with the control system 134. It is contemplated that the data link interface 136 may include other standard data links and may be configured in a manner different from the illustrated embodiment without departing from the teachings of this disclosure.

The control system 134 is operatively connected to an operator interface 140 that may include a plurality of operator input devices such as, for example, a steering device 142, an accelerator pedal or throttle 144, a shift lever 146, a retarder lever 148, and a display 150 for communicating information and commands between the operator and the control system 134. The steering device 142 may be configured or adapted to control the direction of travel of the machine 100 by controlling, for example, a steering angle of the travel mechanisms 104. In some embodiments, the steering device 142 may be actuated by electrical, mechanical, or hydraulic power.

In the illustrated embodiment, the steering device 142 is hydraulically actuated and may include known hydraulic and/or electrical components that may cause one or more linkages to pivotally move to change a steering angle of the machine 100. The operator interface 140 may include a steering angle sensor 152 associated with the steering device 142 and adapted or configured to measure the steering angle of the travel mechanisms 104, and thus, the steering angle of the machine 100.

In some embodiments, the operator interface 140 may include an accelerator pedal position sensor 154 that is associated with the accelerator pedal 144, which is used to determine a requested engine speed that corresponds to a desired motor power. In some embodiments, the desired motor power may correspond with a depression of the accelerator pedal 144. The accelerator pedal 144 may be configured to control an acceleration and/or deceleration of the machine 100. The accelerator pedal position signal may be transmitted from the accelerator pedal position sensor 154 to the other components of the control system 134 to indicate an amount of torque requested by the operator.

The control system 134 may control the electric drive system 102 to produce a desired propulsion of the machine 100 in the forward or the reverse driving directions. The control system 134 may manage torque commands for the motors 116, 118 by taking into account a number of factors, such as operator requests, current machine speed, engine power availability, machine speed limits, and environment factors, including drivetrain and component temperatures. For example, the operator interface 140 may include a shift lever position sensor 156 associated with the shift lever 146 to detect an operator's intention to change from one position of the shift lever 146 to another position of the shift lever 146.

In some embodiments, the control system 134 may determine a desired torque to transmit to the motors 116, 118 based on one or more of the accelerator pedal position signal, a requested gear command signal from the shift lever 146, a retarder lever position signal generated by a retarder lever sensor 158, a payload status, and/or speed limits. The requested gear command signal may represent such gear selections as park, reverse, neutral, drive, or low. The operator may engage the shift lever 146 to control the driving direction of the machine 100. For example, the shift lever 146 may include at least a drive and a reverse position associated respectively with the forward and reverse driving directions of the machine 100.

Overall control of the retarding system 102 and the retarding grid assembly 124 may be managed by the control system 134, which may be embedded or integrated into the controls of the machine 100. In some embodiments, the control system 134 may include one or more controllers. In some embodiments, the one or more controllers may include one or more control modules (e.g. ECMs, ECUs, etc.). The one or more control modules may include processing units, memory, sensor interfaces, and/or control signal interfaces (for receiving and transmitting signals). The processing unit may represent one or more logic and/or processing components used by the control system 134 to perform certain communications, control, and/or diagnostic functions. For example, the processing unit may be configured to execute routing information among devices within and/or external to the control system 134.

Further, the processing unit may be configured to execute instructions from a storage device, such as memory. The one or more control modules may include a plurality of processing units, such as one or more general purpose processing units and or special purpose units (for example, ASICS, FPGAs, etc.). In some embodiments, functionality of the processing unit may be embodied within an integrated microprocessor or microcontroller, including integrated CPU, memory, and one or more peripherals or in multiple microprocessors or microcontrollers. The memory may represent one or more known systems capable of storing information, including, but not limited to, a random access memory (RAM), a read-only memory (ROM), magnetic and optical storage devices, disks, programmable, erasable components such as erasable programmable read-only memory (EPROM, EEPROM, etc.), and nonvolatile memory such as flash memory.

INDUSTRIAL APPLICABILITY

The industrial applicability of the systems and methods for controlling retarding torque in an electric drive system described herein will be readily appreciated from the foregoing discussion. In general, the foregoing disclosure finds utility in various industrial applications, such as the construction and mining industry in providing more efficient cooling in work vehicles and/or machines, such as backhoe loaders, compactors, feller bunchers, forest machines, industrial loaders, skid steer loaders, wheel loaders, and the like. One exemplary machine suited to use of the disclosed systems and methods is a large off-highway truck, such as a dump truck. Exemplary off-highway trucks are commonly used in mines, construction sites and quarries.

Large off-highway or mining trucks with electric drive configurations typically use large resistor banks to dissipate excess energy. These banks are also used during retarding, hence the name "retarding grids". During retarding, negative torque command to the drive motors causes them to act as generators, pushing power upstream into the drivetrain. This power is dissipated in the retarding grids.

This disclosure is directed to controlling electric retarding power into the retarding or resistor grid system. The retarding grid system has hardware components to measure the voltages and currents of the grid. The disclosure uses measurements to calculate the power into the grid system and controls, limits, or derates the retarding torque as a function of the retarding grid power relative to a reference value. Torque control may also include temperature control to augment power control.

Torque control may improve overheating situations and facilitate regulation of the transient conditions of the grid. Torque control based on retarding grid power may improve the accuracy of the torque commands provided to the motors to further reduce the torque inaccuracies in the motors, which may cause the overheating or over power conditions in the retarding grids and consequently cause grid failures. Grid failures make electric drive machines inoperable. Other contributions to inaccuracies may include the power necessary to control the cooling fan, or cooling fan blades installed incorrectly, or inaccurate temperature estimates. Retarding torque control may improve machine performance in high altitude situations where maximum braking capacity is desirable.

FIG. 2 illustrates an exemplary embodiment of the control system 134 and the process (200) of controlling retarding torque in an electric drive system. The method disclosed may be implemented as an algorithm or a set of program codes by which the control system 134 is configured to operate. Based on the method of FIG. 2, the control system 134 may initially or continuously monitor various operating parameters to determine if the machine 100 is in a retarding mode. The control system 134 may also receive a retarding command through the auxiliary input 142 in response to displacement of a manual control by an operator of the machine 100. The retarding command may additionally or alternatively be generated from within the control system 134, or any other control system of the machine 100 that monitors or governs the speed of the machine 100, for example, a speed governor or a speed limiter.

Once a retarding mode of operation is determined, the control system 134 may proceed to determine a first power measurement of a first retarding grid 125 (202). The control system 134 further determines a second power measurement of a second retarding grid 126 (204). The control system 134 may be configured to compare the first and second power measurements to a retarding grid power threshold. The control system 134 is further configured to control a retarding torque command provided to the motors 116, 118 based on the first and second retarding grid power measurements (206). In some embodiments, the control system 134 may also determine a temperature associated with the first 125 and second 136 retarding grids and control the retarding torque command based on the first and second retarding grid power measurements and the temperature of the retarding grid 124.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A system for a machine having an electric drive configuration, comprising:
    an electric motor associated with at least one wheel and adapted to provide retarding torque to the wheel; and
    a controller configured to:
        determine a power measurement of a retarding grid;
        compare the power measurement to a power threshold;
        determine a temperature measurement of a retarding grid; and
        control the retarding torque during retarding as a function of the power measurement and the temperature measurement.

2. The system of claim 1, further comprising:
    a first grid and a second grid; and
    wherein the controller is further configured to:
        determine a power measurement of a first grid and a second grid; and
        control the retarding torque as a function of at least one of the first or the second grids.

3. The system of claim 2, wherein the controller is further configured to:
    determine a power measurement of a first grid and a second grid; and
    control the retarding torque as a function of the first and the second grids.

4. The system of claim 3, wherein controlling the retarding torque includes determining a statistical calculation of the first and the second grid power measurements.

5. The system of claim 3, wherein controlling the retarding torque includes determining at least one of an average or a sum of the first and the second grid power measurements.

6. The system of claim 1, wherein controlling the retarding torque includes decreasing a magnitude of retarding torque provided when the power measurement is above the power threshold.

7. A method for controlling retarding torque of a machine having an electric drive configuration including an electric motor and a retarding grid, comprising:
    determining a power measurement of the retarding grid;
    compare the power measurement to a power threshold;
    determining a temperature measurement of a retarding grid; and
    controlling the retarding torque during retarding as a function of the power measurement and the temperature measurement.

8. The method of claim 7, further comprising:
    determining a power measurement of a first grid and a second grid; and
    controlling the retarding torque as a function of at least one of the first or the second grids.

9. The method of claim 8, further comprising:
    determining a power measurement of a first grid and a second grid; and
    controlling the retarding torque as a function of the first and the second grids.

10. The method of claim 9, wherein controlling the retarding torque includes determining a statistical calculation of the first and the second grid power measurements.

11. The method of claim 9, wherein controlling the retarding torque includes determining at least one of an average or a sum of the first and the second grid power measurements.

12. The method of claim 7, wherein controlling the retarding torque includes decreasing a magnitude of retarding torque provided when the power measurement is above the power threshold.

13. An electric drive machine, comprising:
    an electric motor adapted to provide retarding torque;
    at least one wheel adapted to receive retarding torque from the electric motor;
    a controller operatively connected to the motor, the controller configured to:
        determine a power measurement of a retarding grid;
        compare the power measurement to a power threshold;
        determine a temperature measurement of a retarding grid; and
        control the retarding torque during retarding as a function of the power measurement and the temperature measurement.

14. The machine of claim 13, wherein the controller is further configured to:
    determine a power measurement of a first grid and a second grid; and
    control the retarding torque as a function of the first and the second grids.

* * * * *